United States Patent [19]
Leo et al.

[11] Patent Number: 5,560,821
[45] Date of Patent: Oct. 1, 1996

[54] WASTE WATER TREATMENT SYSTEM

[76] Inventors: Enzo Leo, 875 Pinewood Ter. North, Palm Harbor, Fla. 34683; Billy E. Hendrix; Marlene P. Hendrix, both of 2159 Nursery Rd., Apt. 126, Clearwater, Fla. 34624-2601

[21] Appl. No.: 275,191

[22] Filed: Jul. 13, 1994

Related U.S. Application Data

[63] Continuation-in-part of Ser. No. 116,117, Sep. 2, 1993, abandoned.

[51] Int. Cl.⁶ ........................................... C02F 1/02
[52] U.S. Cl. ................ 210/143; 210/170; 210/181; 210/242.1; 210/251
[58] Field of Search .................. 210/631, 201–203, 210/143, 177, 181, 170, 242.1, 251, 194, 195.1

[56] References Cited

U.S. PATENT DOCUMENTS

| | | | |
|---|---|---|---|
| 4,067,801 | 1/1978 | Ishida et al. | 210/631 |
| 4,073,722 | 2/1978 | Gratsch et al. | 210/631 |
| 4,200,523 | 4/1980 | Balmat | 210/631 |
| 4,318,993 | 3/1982 | Ghosh et al. | 210/631 |
| 4,826,601 | 5/1989 | Spratt et al. | 210/631 |

*Primary Examiner*—Thomas G. Wyse

[57] ABSTRACT

A system for the treating of waste water comprising a first container for receiving and holding waste water to be treated. Further including a second container for effecting a thermal reaction and having a discharge for effluent from the second container. Also including is a third container receiving the effluent of the second container with an associated mechanical separation system for completely breaking down the solids and means to sequentially feed a flow of waste water to the first container and then to the second and third containers.

4 Claims, 2 Drawing Sheets

5,560,821

WASTE WATER TREATMENT SYSTEM

RELATED APPLICATIONS

This is a Continuation-In-Part Application of U.S. Application Ser. No. 08/116,117, filed Sep. 2, 1993 now abandoned.

BACKGROUND OF THE INVENTION

1. Field of the Invention

This invention relates to a waste water treatment system, process and, more particularly, to the treatment of waste water wherein the residue from such treatment is simply non-toxic, environmentally safe effluent that meets the tightest U.S. Coast Guard and IMO specifications for the treatment of waste water.

2. Description of the Background Art

Many types of systems and processes are known for the disposal of waste water including raw sewage. Objectives of such systems and processes are to destroy all harmful bacteria and organisms in the fluid being treated and the elimination of residue as a result of such processes. All such known systems and processes heretofore known have some shortcoming to one extent or another. Either the costs or efficiency of such systems are inadequate for extended use or, in the alternative, the residue in terms of liquid, solids and gases require further treatment or disposal or involve contamination of the environment. In so far as is presently known, no such waste water treatment system, composition or process relates to the use of elements which, meets the tightest U.S. Coast Guard and IMP specifications for the treatment of waste water.

Typical examples of waste water treatments systems, compositions and processes are described in the patent literature. Typical examples of waste water treatment systems, compositions, and processes are described in the patent literature example, U.S. Pat. No. 3,875,357 to Foster et al; 3,862,243 to Bellos; 2,692,231 to Stayner et al; 3,278,375 to Snipe, Jr.; 4,874,526 to Grade et al; 5,120,452 to Ness et al; 5,169,536 to Vasconcellos et al; 5,071,569 to Caulfield et al; 3,925,176 to Okert; 3,354,033 to Buckman et al; 4,676,912 to Eckler; 3,943,044 to Fenn, III; and 3,915,853 to Luck.

Among the most pertinent of such patents are Foster et al, Bellos and Stayner et al. Foster et al discloses a system wherein waste water is vaporized and incinerated for shipboard applications. The only chemical treatment for disinfection is CaO12 or NaC1. Bellos teaches the use of oxyalklated alcohols and anticipates the use of various components in combination with surfactants, quaternary ammonium compounds and other bactericides. Stayner et al discloses a water treatment composition comprising quaternary ammonium salts and other similar compounds. Stayner et al also uses ammonium compounds in combination with promoters such as glycol ethers and dispersing agents such as surfactants.

The other relevant patent references contain one or more of compounds and methods useful in the treatment of waste water. By way of example, Fenn II discloses a system which produces chemical agents and gases electrolytically for treating waste for marine applications. Eckler creates a fuel oil in water emulsion. Okert aerates domestic waste water by maceration then subjects product to electrolysis.

None of the prior art patents, has the capability to treat waste water so as to result in a simple discharge of the non-harmful effluent to the environment.

It is, therefore, an object of the present invention to provide a system for the treatment of waste water comprising a first container for receiving and holding waste water to be treated. Further including a second container for effecting a thermal reaction and having a discharge for effluent from the second container. Also including is a third container receiving the effluent of the second container with an associated mechanical separation system for completely breaking down the solids and means to sequentially feed a flow of waste water to the first container and then to the second and third containers.

A further object of the present invention is to treat waste water in an efficient, ecologically sound and cost effective manner.

A further object of the present invention is to maintain an ecologically sound environment during the processing of waste water, including raw sewage.

A further object of the present invention is to dispose of waste water and its treating chemicals whereby the residue is merely harmless effluent.

These objects should be construed as merely illustrative of some of the more prominent features and applications of the intended invention. Many other beneficial results can be obtained by applying the disclosed invention in a different manner or by modifying the invention within the scope of the disclosure. Accordingly, other objects in a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION:

The invention is defined by the appended claim with the specific embodiment shown in the attached drawings. For the purposes of summarizing the invention, the invention may be incorporated into a system for the treating of waste water comprising a first holding container for receiving waste water to be treated. Further including is a second thermal container for mixing waste water to be treated from the first container with a chemical composition including chemical agents and biological agents for effecting a chemical and biological reaction. The second container has a high level sensor and low sensor with a heater and temperature sensor supporting a thermal reaction and having a discharge for effluent. Further including is a third recirculating container for receiving the output of the second container. The third container has a vented area to eliminate pressure build up and a filtering sock to collect all separated solids with means including an electrically operated ball valve to feed a flow of waste water from the first container to the second container. Also included are means to discharge the chemical agents and then the biological agents to the thermal container for affecting chemical, biological and thermal reactions within the second container and means including a separator system at the output of the third container with a pump therefor and control means coupling the sensors, pumps, heaters and valves of the system for a controlled cycle of operation.

The foregoing has outlined rather broadly the more pertinent and important features of the present invention. The detailed description of the invention that follows is offered so that the present contribution to the art may be more fully appreciated. Additional features of the invention will be described herein after. These forms the subject of the claim of the invention. It should be appreciated by those skilled in the art that the conception and the disclosed specific embodiment may be readily utilized as a basis for modifying or designing other methods and structures for carrying out the same purposes of the present invention. It should also be realized by those skilled in the art that such equivalent methods and structures do not depart from the spirit and scope of the invention as set for in the appended drawings.

DESCRIPTION OF THE DRAWINGS

For a more succinct understanding of the nature and objects of the invention, reference should be directed to the following descriptions taken in conjunction with the accompanying drawings in which.

Similar reference numerals refer to similar parts throughout the several figures.

DETAILED DESCRIPTION OF THE PREFERRED EMBODIMENT

Figure 1:
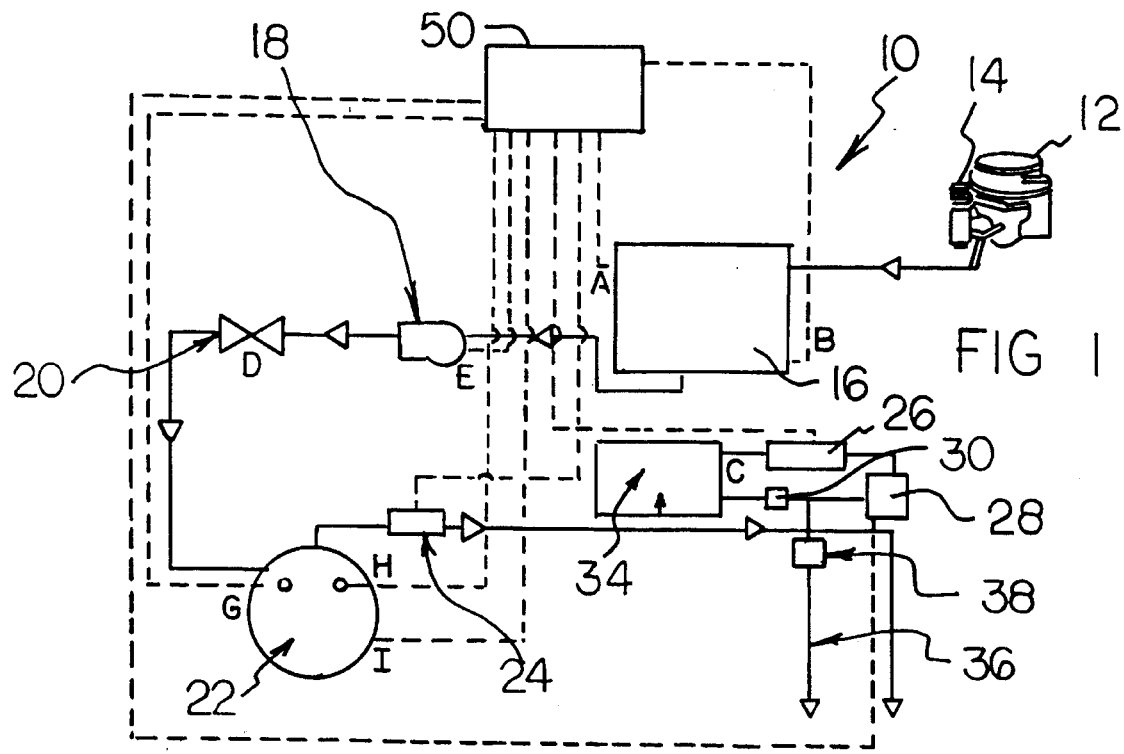
FIG. 1 is the schematic illustration of a waste water treatment system constructed in accordance with the principal of the present invention.
Figure 2:
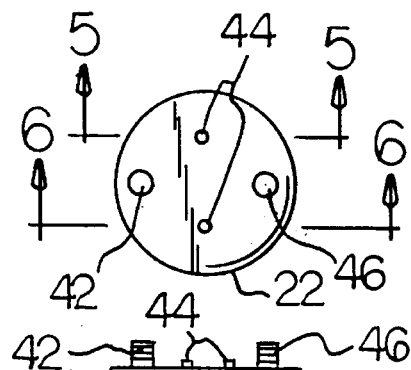
FIG. 2 is a plan view of the second processing tank of FIG. 1.
Figure 3:
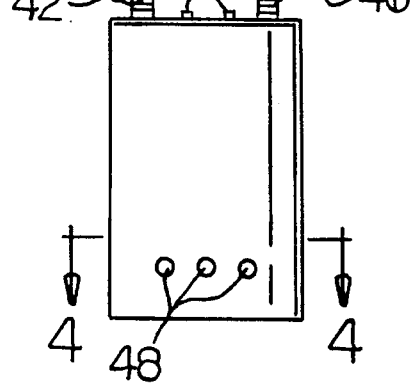
FIG. 3 is an elevational view of the processing tank of FIGS. 1 and 2.
Figure 4:
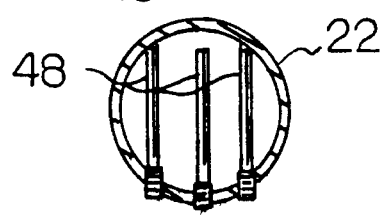
FIGS. 4, 5 and 6 are sectional views taken along the lines 4—4, 5—5 and 6—6 of FIGS. 2 and 3.
Figure 5:
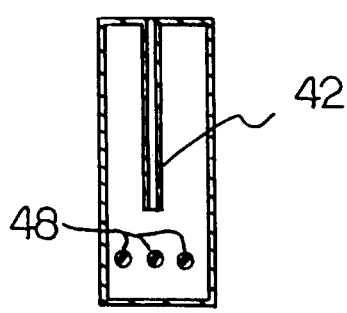
Figure 6:
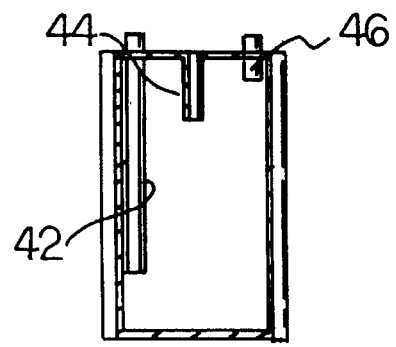

Shown in the Figures, with particular reference to FIG. 1, there is shown a sewage treatment system 10 constituting the primary embodiment of the present invention. More specifically, the improved sewage waste water treatment system 10 is illustrated as being embodied in a plurality of components coupled together for operation and use. Such components include a marine toilet 12 and associated pump 14 of an essentially conventional design, next followed by a first tank 16, next followed by a Macerator pump 18, next followed by an electrically operated ball valve 20, next followed by a second tank 22 for a thermal reaction and chemical mixing, next followed by a one-way solenoid open valve 24 to discharge effluent from the thermal tank, next followed by a recirculating system consisting of a third tank 34, separator 28, water pump 26 and two solenoids 30 and 38 for direction of the fluid flow, next followed by the entrance into the exhaust system 36.

The second processing container 22 is in the form of a general cylindrical shaped tank formed for example of stainless steel material. Such material is preferred to resist the chemicals of the polymers to which it is exposed. The cylindrical shape of the tank is preferred because it permits the combination of waste water, chemicals and generated gases to roll towards the center as it boils and tumbles during the treatment process.

The cylindrical shaped tank or container 22, disclosed for illustrative purposes, is approximately 10 gallon capacity. It has a flat bottom and top, the bottom to position the tank in an upright position as shown. A waste water inlet line 42 projects through the top wall of the tank for emitting waste water into the interior of the tank. Heating elements 48 help promote the chemical reaction. The polymers constitute a group of chemicals capable of killing bacteria and other harmful organisms, and converting the organic to break down the solids on the waste water. The chemicals are added into the thermal tank by the use of lines 44 of a dispensing system. Polymers are injected directly into the thermal tank 22. In this tank the waste water from the first tank is mixed with chemicals and thermally treated to kill the bacteria and begin the breaking down of the waste solids.

The first tank 16 is a holding tank, which collects the waste from the toilet and is used for reference purposes only. Subsequently, the output from the thermal tank is fed by line 46 to the recirculating system 34 where the received materials are mechanically separated for complete processing of the waste water.

In association with the component elements described, the system includes the computerized controller unit 50 as shown in FIG. 1. The computerized controller unit has lines coupling a level sensor A and B in the first tank. Also included is controller E for the Macerator pump 18. Controller D is also provided for the electrically operated ball valve 20. Controllers C, F and D are also utilized to control the third tank 34, separator 28 and second tank 22. The last two controllers are a high level sensor G and a low level sensor H for the second or thermal reaction in the processing tank 22. In operation and use, the controller unit functions as follows:

A. The unit must be put into operation mode by manually opening switch with a key lock.

B. The microprocessor receives a signal from the high level indicator in the holding tank to begin the process.

C. The controller unit opens the ball valve and turns on the Macerator Pump until the high level indicator in the processing tank indicates full.

D. At high level the control unit turns off the macerator pump, closes the electrically operated ball valve and turns on the heating elements sequentially at 5 second intervals.

E. When fluid temperatures reach approximately 160 degrees the control unit turns off the heating element and opens the discharge solenoid valve 24 and turns on the water pump 26 to begin the recirculating process through the separator.

F. When the fluid level in the processing tank drains to low fluid level, the macerator and ball valve are actuated and the discharge solenoid is closed. Once the fill cycle reaches the water level reaching high fluid level is attained, the heaters are once again activated and the process as before is repeated.

G. When the black water tank has no effluent to be processed, a timing delay on the macerator pump sends a signal to the control unit to automatically shutoff the entire system. (NOTE: As an added feature, in the event the black tank has a blockage of some kind, limiting effluent to the macerator, the control unit will shut off all operations.)

The preferred chemicals used in the system of the present invention and the approximate percentages by volume are Magna-Bon 60; this is a nontoxic, nonflammable, food grade chelated copper based mixture developed exclusively by the Magna-Bon Corporation in Okeechobee, Fl.

Magna-bon is a unique suspension of copper sulfate pentahydrate. In the manufacturing process of Magna-Bon, the manufacturers were able to break the copper crystal into a very fine particle size molecule structure, much finer than found in any other coppery sulfate pentahydrate solution. In addition to the molecular breakdown, Magna-bon will carry an electrical charge of a very few millivolts that will attract the appetite of the bacteria, virus, fungus and any mold to the copper molecule. The third unique characteristic of Magna-Bon is the addition of Sobertrol which is a chelating agent that will hold the copper molecule in solution indefinitely. Magna-Bon differs from other copper sulfate solutions in the fact that other copper sulfate solutions will drop the copper molecule out as sediment and will no longer be available for the bacteria to consume. Sobertrol chelates by electrically bonding to the copper molecule. This electrical bond is the attracting element as explained previously.

Magna-Bon 60 is composed of the following chemicals:
1. Ammonium Sulfate: 0.003% in base ingredient Sobertrol.
2. Copper Sulfate: 19.8% (5% Metallic Copper).
3. Sulfuric Acid: 55% in base solution.

The three ingredients listed are used to form the base chemical known as Sobertrol. The Sobertrol is diluted at a one to ten rate with water (10 parts water with 1 part Sobertrol) to form the Magna-Bon 60 product.

Magna-Bon 60 as utilized in the invention is mixed at a rate of 1 to 30,000 parts. Meaning 1 part Magna-Bon to 30,000 parts waste water. This rate of dilution is sufficient to enhance the bacteria destroying properties of the invention.

Other chemicals that will enhance the system's ability to destroy bacteria, but may not be as effective, are any number of commercially available biological enzyme treatments that are used to treat waste water.

When in operation, the effluent level of the tank 22 rises above the non-operative level dependent on the proportions of waste water together with the temperature and pressure build up allowed. The thermal and chemical reactions in the processing tank cause the development of a self induced vacuum which is used to discharge the effluent to the recirculating tank.

The effluent in the processing tank is let out of the processing chamber through an outlet pipe 42 projecting through a lid in the top of the tank. The pipe has an electrically controlled solenoid valve which is activated by a signal from the controller once sufficient temperature and pressure is achieved. This is indicated by a sensor mounted on the side of the processing tank. The discharged effluent is collected in a nylon recirculating tank and a water pump is activated to begin the final separating process. The water pump cycles the effluent through a cyclone separator 28 as of the type manufactured by Griswald Controls in Irvine, Calif. After approximately 20 minutes the controller sends a signal to the solenoids on the recirculating system to stop circulating and to exhaust effluent through the exhaust system of the vessel.

During the separating process, a portion of the effluent containing the highest concentration of solids is continually being purged through a filtering sock and back into the recirculating tank. As the solids are accumulated and the sock becomes full, a threaded cap is removed and the sock is replaced.

The operation of the system is as follows: Polymers consisting of the hereto before identified chemicals together with a thermal exciting process kill all bacteria and other organisms that can be harmful and convert the organics of the waste water to effluent that can be liberated to the ocean waters. The thermal exciter is positioned in the processing chamber and has the heating elements at the bottom of the chamber. The function of the thermal exciter unit is to increase the temperature of the polymers and the inflow of waste water to the interconnected pipes to accelerate the processing of the waste water. The thermal exciter is housed in a stainless steel fitting. The exciter unit has a series of interconnected heating elements to dissipate controlled heating to the polymers and waste water being processed. A thermal indicator control unit is positioned above the low level of the waste water being processed and is provided to permit control of the unit. Waste water of whatever kind that is to be processed is then admitted to the processing chamber through the inlet pipes. The waste water is released from the processing chamber where it is mixed with the chemicals. As the waste water works its way to the surface of the polymers any bacteria or other organisms that are in the waste water are killed within a few seconds due to the combination of heat and chemicals attacking the waste water to break down the solids, and to kill any living organisms therein. As the processing of the waste water continues the effluent mixed with the chemicals of the polymers bubble and boil and flow upward on the side of the processing chamber of the tank which may be formed as a cylinder. The waste water being processed and the chemicals of the polymers are deflected inwardly towards the center of the processing chamber as they bubble upwardly on the inward curving of the cylindrical chamber. A thorough mixing of the waste water with the chemicals of the polymer is thus assured so that the disassociation of the solids can begin. The effluent from the processing chamber is discharged through the outlet pipe and transferred through the pipe to the recirculating tank. The discharge of the recirculating units are controlled by the computerized control unit. The unit has suitable low pressure gages to indicate the pressure in the processing chamber, and the relation of the temperature and pressure requirements required. The control unit has fixed probes that indicate the high and low working levels in the processing chamber.

As previously stated herein, effluent emanating from the discharge pipe passes from the thermal processing tank to the recirculating chamber where the effluent is passed through a particle separator specifically designed for this application. The process utilized by the system is unique in that it is a chemical biological thermal mechanical process that completely kills off bacteria and other organisms with the same effectiveness as larger municipal sewage treatment systems. The process completely kills and treats waste water efficiently and effectively. In the first embodiment of the invention, the system is configured for use in association with a marine toilet. The marine toilet including its pump as well as its black water tank are conventional.

In the past the black water tank could be emptied only at port through proper approved channels. According to the present invention, the contents of the black water tank are pumped through a macerator tank through an electrically actuated ball valve to the processing tank. Chemical composition is added to the processing tank by dispensing such chemicals into the tank at the time of filling, normal ratio is 1 per 30,000 mixture of water to chemical. The output effluent from the recirculating tank is moved by line in association with a water pump to open water. The output of the recirculating tank is that by a single line for discharge into the output of the exhaust upper motor of the marine vehicle in which it is located.

It should be understood that the equipment and process as described above is capable of purifying water without the use of chemicals in those instances where the initial water purity is reasonably high and the contaminants are low.

In the second embodiment of the invention, the processing chamber 22 could be located underground within a secured structure 54. It is located adjacent to a holding tank such as a conventional septic tank 56. The drawing merely illustrates the holding tank with a line 58 as from a house. Any of the output of fluid waste content from a house could be so fed to the holding tank. It is preferred that the output from the garbage disposal, if any, is fed along with the waste water lines. According to the process of the second embodiment, the effluent is simply pumped through an associated water pump 62. The preferred pump in all embodiments is a marine duty, explosion proof type with a sealed motor.

In a manner similar to that of the first embodiment the raw sewage from the house is fed by a line to the first or holding tank 56. With the use of a macerator pump 62 the sewage is then pumped into a processing or thermal tank 22 for both thermal and chemical treatment.

Figure 7:
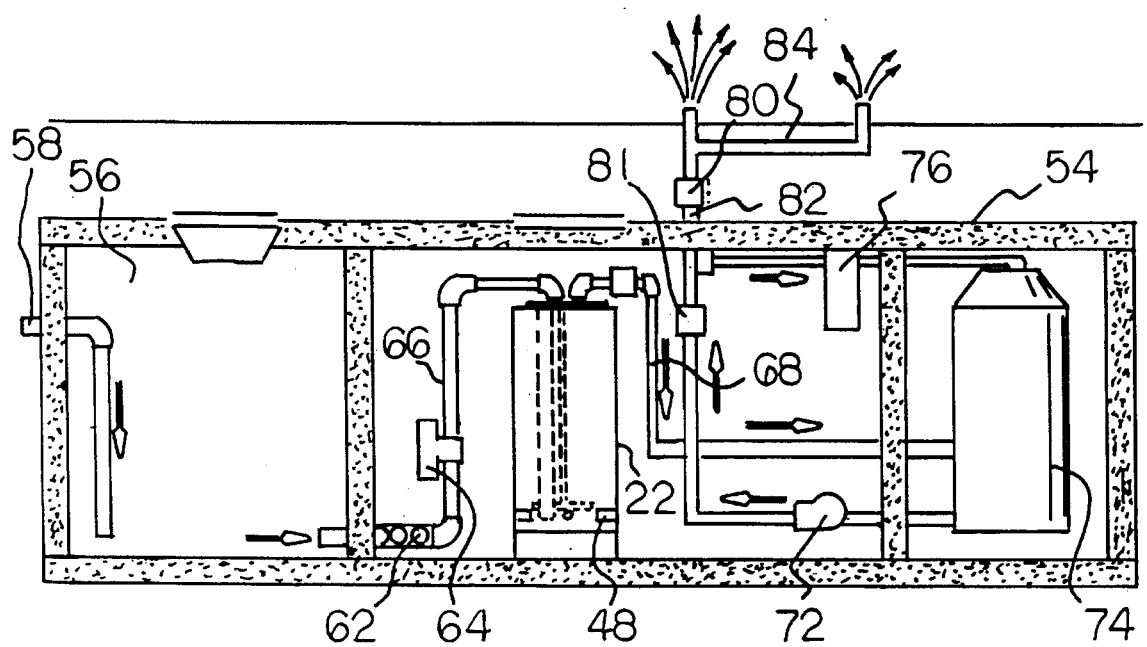
FIG. 7 is a schematic illustration of a waste water treatment system constructed in accordance with the alternate embodiment of the invention.

From this point the sewage is processed in exactly the same system and application as the first embodiment. As a particular matter, such raw sewage may be the entire output from a residence. In the system of FIG. 7, the holding tank 56 receives the input as waste water and sewage. The macerator pump 62 feeds the waste water through an electrically actuated ball valve 64 which feeds the output from the first tank to a second or processing tank 22. At this point the waste water is treated through a thermal and chemical reaction. Line 66 receives effluent to the second or thermal reaction tank 22 while an output line 68 feeds the effluent into a recirculating/separating system as previously described. The separator system consists of a water pump 72, recirculating tank 74, separator 76 and discharge Solenoids 80 and 81. As in the first embodiment heaters 48 are provided at the bottom of the thermal or processing tank. Again, as in the prior embodiment, the effluent is recirculated in the separator system for approximately 20 minutes. After this time the effluent is channeled to the surface atmosphere to use in irrigation and fertilization.

As in the prior embodiment, a control system interrelates the activation and inactivation of the various functions and components of the entire system. The effluent is directed through piping 82 by the Solenoids 80 and 81 and is fed by a line 84 for use in a sprinkler system for irrigation purposes.

The present invention greatly reduces the complexity of current treatment. This system alleviates the continuing problem of having to discard, recycle or perform additional treatment to the waste stream. The present invention also provides a system that completely breaks down and kills all of the bacteria and other living organisms in the waste water, which is not achieved in current treatment systems. The present disclosure includes that contained in the appended claims as well as that of the fore going description. Although this invention has been described in its preferred form with a certain degree of particularity, it should be understood that the present disclosure of the preferred form has been made only by way of example and that numerous changes in the detail of construction and combination and arrangement of parts may be resorted to without departing from the spirit and scope of the invention. Now that the invention has been described.

What is claimed:

1. A system for the treating of waste water comprising:

a first container for receiving and holding waste water to be treated, a second container for effecting a thermal reaction and having a discharge for effluent from the second container, a third container receiving the effluent of the second container with an associated mechanical separation system for completely breaking down the solids and means to sequentially feed a flow of waste water to the first container and then to the second and third containers;

means to feed a chemical composition to the second container for the processing and effecting reactions within the third container;

a mechanical separator at the output of the third container; and control means coupling the operational components of the system.

2. A system for the treating of waste water comprising, in combination: a first holding container for receiving waste water to be treated;

a second thermal container for mixing waste water to be treated from the first container with a chemical composition including chemical agents and biological agents for effecting a chemical and biological reaction, the second container having a high level sensor and low sensor with a heater and temperature sensor supporting a thermal reaction and having a discharge for effluent; and a third recirculating container for receiving the output of the second container, the third container having a vented area to eliminate pressure build up and a filtering sock to collect all separated solids with means including an electrically operated ball valve to feed a flow of waste water from the first container to the second container, means to discharge the chemical agents and then the biological agents to the thermal container for affecting chemical, biological and thermal reactions within the second container, means including a separator system at the output of the third container with a pump therefor and control means coupling the sensors, pumps, heaters and valves of the system for a controlled cycle of operation.

3. The system as set forth in claim 2 and further including a marine toilet and an engine with an exhaust located aboard ship with a line coupling the first holding container and the marine toilet for feeding the output of the marine toilet to the first holding container and a line coupling the third recirculating container and the exhaust of the engine for feeding the effluent of the third recirculating container to the exhaust of the engine.

4. The system as set forth in claim 2 wherein the processing containers are located beneath the surface of soil, with an encasing sealing container for a house and a line for coupling the house and the first holding container whereby waste water discharged from the house is fed to the first holding container and with a line between the first holding container and the second thermal container for chemical and biological reactions with thermal excitation therein and a line coupling the second thermal container and the third recirculating container and a line coupled to the third recirculating container for exhausting to the surface atmosphere.

* * * * *